Patented Aug. 16, 1949

2,479,090

UNITED STATES PATENT OFFICE 2,479,090

THERMOSETTING RESINS PLASTICIZED WITH POLYESTERS

Henry P. Wohnsiedler, Darien, Conn., assignor to American Cyanamid Company, New York, N. Y., a corporation of Maine No Drawing. Application July 19, 1946, Serial No. 684,784

5 Claims. (Cl. 260—45.2)

This invention relates to melamine resins plasticized with polyesters. More particularly, it is directed to melamine-formaldehyde condensation products having incorporated therein and/or reacted therewith a polyester derived from dicarboxylic acids and polyhydroxy compounds.

It is among the objects of this invention to prepare melamine resins having improved toughness, molding properties, and cure; and, provide new materials suitable for laminating, molding and surfacing of laminates.

The foregoing and other objects and advantages of this invention are attained by incorporating in a melamine-formaldehyde condensation product, obtained by reacting 2 to 3 mols of formaldehyde per mol of melamine, a polyester derived from reacting glycerol or ethylene glycol with a diabasic acid of the straight-chain type, varying from 4 to 10 carbon atoms, or with phthalic anhydride. These plasticizers or modifying resins differ in physical form, degree of compatibility and solubility but have the common feature of improving flexibility, impact strength and other mechanical properties of the melamine-formaldehyde.

The following examples are given to illustrate various suitable polyesters and the process of preparing them, and are not to be construed as limitations.

Example 1

124 parts of ethylene glycol and 202 parts of sebacic acid are heated together, under conditions allowing for discharge of water, at slowly rising temperature for three hours to 225° C. It is held at this temperature for 7 hours to complete the reaction. A soft wax with a softening point of 60°–65° C. and an acid number of 2 was obtained by this procedure.

Example 2

379 parts of ethylene glycol, 606 parts of sebacic acid, and 438 parts of adipic acid were heated for 5 hours at 200° C. under agitation effected by bubbling nitrogen gas through the mixture. Heating was continued at this temperature for 14 hours under a reduced pressure of 3 mm. The product obtained by this procedure was a tan colored wax with a melting point of 50°–55° C. and had an acid number of 35.

Example 3

194 parts of glycerol and 404 parts of sebacic acid were heated, under conditions allowing for discharge of water, for 1½ hours at slowly rising temperatures until the temperature had reached 215° C., after which the heating was continued at this temperature for 1½ hours. The product obtained by this procedure was a very viscous liquid having an acid number of 43. A gel was obtained when this product was heated for a longer period of time. The liquid resin was soluble in ethylene glycol monoethylether and also in alcohol at solids content above 13%. It tolerated only a limited amount of a 1-1 mixture of alcohol and water and was not soluble therein at 50% solids.

Example 4

291 parts of glycerol and 404 parts of sebacic acid were heated, under conditions allowing for discharge of water, for 3½ hours at a temperature of 220°–330° C. to obtain a very viscous liquid having an acid number of 4. When the ratio of proportions are in the order illustrated by this example the material can be obtained by heating freely without danger of gelation.

Example 5

Glycerol and adipic acid in equal molecular proportions were heated, under conditions allowing for discharge of water, for 1¼ hours at a rising temperature to 235° C. The material was heated for 30 minutes more at this temperature followed by gradual reduction of the temperature to 175° C., which reduction took approximately 1 hour and 20 minutes. A liquid product was obtained in this manner.

Example 6

1017 parts of glycerol and 1020 parts of adipic acid were heated and the temperature raised to 225° C. This temperature was held for 3 hours. The product was an easily pourable liquid with an acid number of 4. This resin was soluble in a 1-1 mixture of water and alcohol.

Example 7

581 parts glycerol and 444 parts of phthalic anhydride were heated with discharge of condensation water to 215° C. and reacted at 215–225° C. for 4 hours. A very viscous resin was obtained having an acid number of 9. This resin could be thinned with water to the extent of 60 gs. per 100 gs. of resin. It was soluble in alcohol and in a 1-1 mixture of water and alcohol.

Materials having low acid numbers are obtained wherein there is greater molecular quantity of glycerol or ethylene glycol and under such conditions the products may be obtained with less stringent controls. The above materials may be employed as plasticizers or modifiers of nonalkylated melamine-formaldehyde resins, particularly those resins wherein the ratio of melamine to formaldehyde is 1 mol of melamine to about 2 to about 4 mols of formaldehyde, preferably the ratio 2 to 3 mols of formaldehyde per mol of melamine. The resultant plasticized or modified material may be employed in the cured state in the form of molded, laminated and overlay resins or in the treatment of fabrics.

By way of illustration, the following plasticized compositions and method of using same are given:

Example 8

1175 parts of melamine resin having a formaldehyde to melamine ratio of 2:1 were dissolved in 700 parts ethylene glycol monoethyl ether by heating to about 70° C., and mixed with 375 parts glycerol adipate resin Example 6, dissolved in 150 parts of the same solvent. The pH was raised to 7.6 gradually over a period of 35 minutes by the addition of 55 parts of normal alcoholic sodium hydroxide. The temperature during this period was 80–85° C. Stirring was used thruout the reaction. Vacuum was then applied and the solution concentrated to a viscous, molten resin over 1½ hours by taking its temperature to about 110° at 14 cm. pressure. When cooled, the product solidified to a transparent resin. It was only partially soluble in alcohol or ethylene glycol monoethyl ether.

Example 9

700 parts of glycerol adipate, Example 6, and 700 parts of melamine formaldehyde resin (1–2) were melted together in an open stainless steel pot. The polyester was first melted and 143 parts of alcoholic NaOH (normal) added bringing the pH to 8.2. The melamine resin was then added over 15 minutes with the mixture being slowly stirred. The temperature of the heating oil bath was 110–120° C. Moisture was then given off as evidence of co-reaction. Heating was continued at 120–128° for 45 minutes with frequent additions of reagent to maintain the pH at 7.6–7.8. 120 cc. were required. The product was then cooled quickly to a clear, amber colored, tough and non-sticky resin.

Plasticized molding resins may be made in several ways, for instance the polyester containing unesterified hydroxyl groups may be combined with the melamine-formaldehyde resin to form a single resin or it may be reacted with the melamine-formaldehyde resin during usual processing operations. Typical of the first procedure are the following molding compounds:

1000 parts of the resin of Example 8 were finely ground and mixed with 10 parts of zinc stearate. This was charged to differential rolls heated at 125° C. (fast roll) and 105° C. (slow roll), and after 4 minutes removed therefrom in the form of a sheet which was cooled and granulated. When this material was molded at 150° C. and 4000 pounds per square inch with cure of 15 minutes a uniform, highly translucent molded product was obtained. Water absorption was only 1.1% after a 30 minute boil.

The resin of Example 9 was processed in a similar manner except that it was charged to differential rolls in stearate-treated bulk form. Molded pieces in this case were uniformly translucent and very flexible. In this as well as the foregoing instance, improved resistance to cracking around inserts was recorded in comparison with the unplasticized melamine resin.

As an example of the process for preparing a compound during usual processing operations, the following procedure is given by way of illustration:

750 parts of melamine-formaldehyde resin (1:2) and 10 parts of zinc stearate were charged to differential rolls heated at 120° C. (fast roll) and 65° C. (slow roll) and to this mixture there was slowly added 250 parts of glycerol sebacate prepared by Example 4. After approximately 32 minutes the material was removed therefrom in the form of a sheet which was cooled and granulated. When this material was molded at 150° C. and 4000 pounds per square inch with a 10 minute cure, a uniformly clear material was obtained which had a water resistance of 0.77% absorption after 30 minutes boiling.

In like manner, a cellulose filled composition was prepared. 487 parts melamine resin, 10 parts zinc stearate and 350 parts of alpha cellulose were dry blended and charged to differential rolls at 125/85° C. 163 parts of glycerol adipate, Example 6, were added. Polymerization and formation of the sheet required 9–11 minutes. The granular molding compound had excellent molding properties and improved toughness manifested by increased resistance to cracking.

The following table summarizes some of the experiments with these materials in the preparation of laminates. In these experiments paper sheets were impregnated with solutions containing 50% to 60% solids, dried at temperatures of 105°–120° C., assembled in multiple, and pressed at 150° C. and 1000 pounds per square inch for 30 minutes to yield 1/16 inch laminates. In all of these experiments the melamine-formaldehyde resin employed was a condensation reaction product of 2 mols of formaldehyde per mol of melamine.

| Melamine-Formaldehyde Resin (1:2) Per Cent of Resin Solids | Polyester | | Per Cent Water Adsorption 24 Hours at 25° C. | Impact Strength | Flexural Bending Angle |
|---|---|---|---|---|---|
| | Example No. | Per Cent of Resin Solids | | | |
| 100 | ------ | ------ | 1.5 | 20 | 7.3 |
| 75 | 1 | 25 | 2.6 | 33 | 9.0 |
| 75 | 2 | 25 | 4.4 | 30 | 10.0 |
| 75 | 3 | 25 | 0.9 | 28 | 15.0 |
| 50 | 3 | 50 | 0.8 | 47 | 19.0 |
| 25 | 3 | 75 | 1.2 | 55 | 21.0 |
| 50 | 5 | 50 | 2.2 | 40 | 18.0 |

The glycerol polyesters are compatible with the melamine resin in all proportions and the films prepared therewith become clearer in proportion to the percentage of polyester employed in effecting the final resin. Likewise, glycerol polyesters can be used successfully in alcohol-water solutions with the melamine resins. Polyesters having an alcohol to acid molar ratio of 1.5 or higher are particularly suitable. These resins are also desirably low in acid value for direct use with melamine-formaldehyde resins. Polyesters having an acid number less than 10 are advantageous. The glycol esters are soluble in alcohol-water only at temperatures in excess of 60° C. Accordingly, it is advisable to employ ethylene glycol monoethyl ether solvents when blending these glycol polyesters with the melamine-formaldehyde resin. As a general rule the glycol polyesters are limited by compatibility with melamine-formaldehyde resins to approximately 20% of the total resin content.

These materials have been found suitable for application in the art of surfacing low priced laminates or core stock, to provide panels having excellent surface gloss and resistance to craze, crack and abrasion.

A panel with a pigmented, plastic, surface finish was prepared in the following way: 44 parts of melamine resin and 11 parts of polyester resin (Example 7) were dissolved in 100 parts of 1-1 alcohol water solution and to this were added 0.5 part diethyl amino ethanol and 45 parts of titanium dioxide pigment. The mixture was ground in a ball mill overnight. This syrup was then coated on an unsized sheet of paper and the sheet dried 30 minutes at 90° C. It was then assembled with a sheet of melamine resin, laminating stock paper and a Masonite panel. The assembly was pressed at 1000 p. s. i. and cured by heating 30 minutes at 150° C. The press was cooled and the panel removed.

These materials have also been found suitable for use with textiles or fabrics by impregnating the textile or fabric with a volatile solution of the plasticized resin followed by drying and pressing to yield a sheet containing a more flexible and tougher resin. These plasticized resins may be further used in the application wherein resins having high electric strength and other electrical properties are desired.

I claim:

1. A thermosetting molding composition comprising (1) a condensation product of ingredients consisting of formaldehyde and melamine in the ratio of about 2 mols of the former per mol of the latter, and (2) a plasticizer for the condensation product of (1) and which forms a homogeneous composition therewith, said plasticizer being a polyester resin containing unesterified hydroxyl groups and which is obtained by reaction of ingredients consisting of (a) glycerol and (b) a reactant selected from the group consisting of phthalic anhydride, adipic acid and sebacic acid, the reactants of (a) and (b) being employed in the ratio of 1 mol of the latter to not less than 1.5 mols of the former, said polyester resin having an acid number of less than 10.

2. A thermosetting molding composition comprising (1) a condensation product of ingredients consisting of formaldehyde and melamine in the ratio of about 2 mols of the former per mol of the latter, and (2) a plasticizer for the condensation product of (1) and which forms a homogeneous composition therewith, said plasticizer being a polyester resin containing unesterified hydroxyl groups and which is obtained by reaction of ingredients consisting of (a) glycerol and (b) a reactant selected from the group consisting of phthalic anhydride, adipic acid and sebacic acid, the reactants of (a) and (b) being employed in the ratio of approximately 1.5 mols of the former per mol of the latter, said polyester resin having an acid number of less than 10, and said condensation product of (1) and said plasticizer of (2) being present in the said thermosetting composition in a weight ratio of about 3 parts of the former to one part of the latter.

3. A thermosetting molding composition comprising (1) a condensation product of ingredients consisting of formaldehyde and melamine in the ratio of about 2 mols of the former per mol of the latter, and (2) a plasticizer for the condensation product of (1) and which forms a homogeneous composition therewith, said plasticizer being a polyester resin containing unesterified hydroxyl groups and which is obtained by reaction of ingredients consisting of glycerol and sebacic acid in the ratio of 1 mol of the latter to not less than 1.5 mols of the former, said polyester resin having an acid number of less than 10.

4. A thermosetting molding composition comprising (1) a condensation product of ingredients consisting of formaldehyde and melamine in the ratio of about 2 mols of the former per mol of the latter, and (2) a plasticizer for the condensation product of (1) and which forms a homogeneous composition therewith, said plasticizer being a polyester resin containing unesterified hydroxyl groups and which is obtained by reaction of ingredients consisting of glycerol and adipic acid in the ratio of 1 mol of the latter to not less than 1.5 mols of the former, said polyester resin having an acid number of less than 10.

5. A thermosetting molding composition comprising (1) a condensation product of ingredients consisting of formaldehyde and melamine in the ratio of 2 mols of the former per mol of the latter, and (2) a plasticizer for the condensation product of (1) and which forms a homogeneous composition therewith, said plasticizer being a polyester resin containing unesterified hydroxyl groups and which is obtained by reaction of ingredients consisting of glycerol and sebacic acid in the ratio of approximately 1.5 mols of the former per mol of the latter, said polyester having an acid number of less than 10, and said condensation product of (1) and said plasticizer of (2) being present in the said thermosetting composition in a weight ratio of about 3 parts of the former to 1 part of the latter.

HENRY P. WOHNSIEDLER.

REFERENCES CITED

The following references are of record in the file of this patent:

UNITED STATES PATENTS

| Number | Name | Date |
| --- | --- | --- |
| 1,783,166 | Bruson | Nov. 25, 1930 |
| 2,014,889 | Goldschmidt et al. | Sept. 17, 1935 |
| 2,187,566 | Bruson | Jan. 16, 1940 |
| 2,197,357 | Widmer | Apr. 16, 1940 |
| 2,218,474 | Moore | Oct. 15, 1940 |
| 2,294,590 | West | Sept. 1, 1942 |
| 2,341,735 | Monsaroff | Feb. 15, 1944 |

FOREIGN PATENTS

| Number | Country | Date |
| --- | --- | --- |
| 595,879 | Germany | June 22, 1937 |